(12) United States Patent
Zhang et al.

(10) Patent No.: US 7,795,880 B2
(45) Date of Patent: Sep. 14, 2010

(54) DETECTING APPARATUS

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 310 days.

(21) Appl. No.: 11/945,270

(22) Filed: Nov. 27, 2007

(65) Prior Publication Data

US 2008/0129315 A1 Jun. 5, 2008

(30) Foreign Application Priority Data

Dec. 5, 2006 (CN) .................. 2006 1 0201215

(51) Int. Cl.
*G01R 31/02* (2006.01)
(52) U.S. Cl. .................. 324/555; 324/758; 324/556
(58) Field of Classification Search .................. None
See application file for complete search history.

(56) References Cited

U.S. PATENT DOCUMENTS

| | | | | |
|---|---|---|---|---|
| 3,824,462 A | * | 7/1974 | Vinsani | 324/555 |
| 4,061,969 A | * | 12/1977 | Dean | 324/761 |
| 4,357,575 A | * | 11/1982 | Uren et al. | 324/758 |
| 4,412,385 A | * | 11/1983 | Selleri | 33/542 |
| 4,463,310 A | * | 7/1984 | Whitley | 324/758 |
| 5,457,392 A | * | 10/1995 | Filipescu | 324/555 |
| 5,909,124 A | * | 6/1999 | Madine et al. | 324/761 |
| 6,798,228 B2 | * | 9/2004 | Cuevas | 324/755 |
| 7,348,768 B2 | * | 3/2008 | Lee | 324/158.1 |
| 2005/0235790 A1 | * | 10/2005 | Dieterle et al. | 83/72 |

FOREIGN PATENT DOCUMENTS

| | | |
|---|---|---|
| CN | 2494523 Y | 6/2002 |
| CN | 1591032 A | 3/2005 |
| JP | 61187087 A * | 8/1986 |
| JP | 03017566 A * | 1/1991 |

* cited by examiner

*Primary Examiner*—Timothy J Dole
*Assistant Examiner*—John Zhu
(74) *Attorney, Agent, or Firm*—Frank R. Niranjan

(57) ABSTRACT

A detecting apparatus for checking a detected item of an electrically conductive fastener attached to a workpiece includes a lower checking member for supporting the workpiece, an upper checking member movably set above the lower checking member, an electrical source, a processor, and an indicator. At least one of the two members includes a checking unit, which touches with the fastener and together with the fastener forms a detecting circuit when the upper checking member abuts against the workpiece. The detecting circuit is connected to the electrical source. A closed or open state of the detecting circuit indicates whether the detected item is eligible or ineligible. The processor controls the indicator to show the checking result according to the closed or open state of the detecting circuit. The detecting apparatus can greatly improve the checking efficiency and reliability, and suits mass production.

18 Claims, 13 Drawing Sheets

DETECTING APPARATUS

BACKGROUND

1. Field of the Invention

The present invention relates to detecting apparatuses.

2. Description of Related Art

On an assembly line, a mass of parts, such as fasteners installed in workpieces, may need to be checked whether they are attached to the workpieces properly.

Referring to FIG. 1, a workpiece 90, such as a chassis of a liquid crystal display (LCD), is shown. Electrically conductive fasteners of the workpiece 90, which need to be checked, include two first rivets 6, three second rivets 16, two third rivets 8, a fourth rivet 7, a square piece 188, and a long piece 19. The first rivets 6 and the second rivets 16 are very much alike, but the first rivet 6 is longer. For these fasteners, detected items include: first, checking whether the fasteners are attached to the workpiece 90; second, checking heights of the first rivets 6 and the second rivets 16; third, checking whether the first rivets 6 and the second rivets 16 are attached to the workpiece 90 at predetermined places respectively; and fourth, checking linearity and/or position of the first rivets 6, the second rivets 16, and the third rivet 7.

Typically, the first and third detected items are visually checked by workmen. It is time-consuming and labor-intensive for the workmen, and a long time working will easily cause eye fatigue, which leads to a low checking accuracy and a high checking error rate. This way is inefficient and unfit for mass production.

Referring to FIGS. 2 and 3, checking the heights of the first rivets 6 and the second rivets 16 is done manually by workmen using some tools, such as a height detecting tool 91. Referring particularly to FIG. 3, a distance between a first cantilevered portion of the height detecting tool 91 and a reference plane, dimensioned as Dmax means a maximum permitted height of a part to be checked, while a distance between a second cantilevered portion of the height detecting tool 91 and the reference place, dimensioned as Dmin means a minimum permitted height of the part. In detection, the height detecting tool 91 is advanced towards one of the rivets, such as one rivet 6, with a bottom of the tool 91 abutting on the surface of the workpiece 90. The surface of the workpiece 90 acts as the reference plane. If the first cantilevered portion of the tool 91 corresponding to the Dmax can pass the rivet 6 and the second cantilevered portion thereof corresponding to the Dmin can not pass the rivet 6, a height of the rivet 6 is eligible, otherwise, the height is ineligible. Moreover, different height rivets need different height detecting tools for checking. Thus, checking rivets in this way is complex and labor-intensive for the workmen, and it is inefficient and unfit for mass production.

A detecting tool 92 shown in FIG. 4 is commonly used for checking the accuracy of linearity and/or position of the first rivets 6, the second rivets 16, and the third rivet 7. In use, the workman grips a handle of the tool 92, and moves the tool 92 to the workpiece 90 to see whether the first rivets 6, the second rivets 16, and the third rivet 7 can enter corresponding detecting holes defined in the tool 92. If each rivet enters the corresponding detecting hole smoothly, the linearity and/or position of the rivet is eligible; otherwise, it is ineligible. Checking in this way, it's hard for the workman to align the checking holes of the tool 92 with the rivets of the workpiece 90, and the tool 92 may accidently bump the rivets in aligning process. Moreover, it is hard for the workman to judge contact between a number of walls bounding the corresponding holes and corresponding rivets, which seriously affects a detecting accuracy.

What is desired, therefore, is a detecting apparatus suitable for use in mass production environment, which improves checking efficiency and reliability.

SUMMARY

An exemplary detecting apparatus for checking at least one detected item of at least one electrically conductive fastener attached to a workpiece, includes a lower checking member configured to support the workpiece, an upper checking member movably set above the lower checking member, an electrical source, a processor, and an indicator. At least one of the lower checking member and the upper checking member comprises at least one checking unit corresponding to the at least one detected item of the fastener. The at least one checking unit can cooperate with the corresponding fastener to form a detecting circuit. The detecting circuit is connected to two electric poles of the electrical source. A closed or open state of the detecting circuit exists depending on whether the at least one checking unit touches the corresponding fastener when the upper checking member abuts against the workpiece to close the detecting circuit, and indicates whether the detected item is eligible or ineligible. The processor controls the indicator to show the checking result according to the closed or open state of the detecting circuit.

Other advantages and novel features will become more apparent from the following detailed description when taken in conjunction with the accompanying drawings, in which:

DETAILED DESCRIPTION

Figure 1:
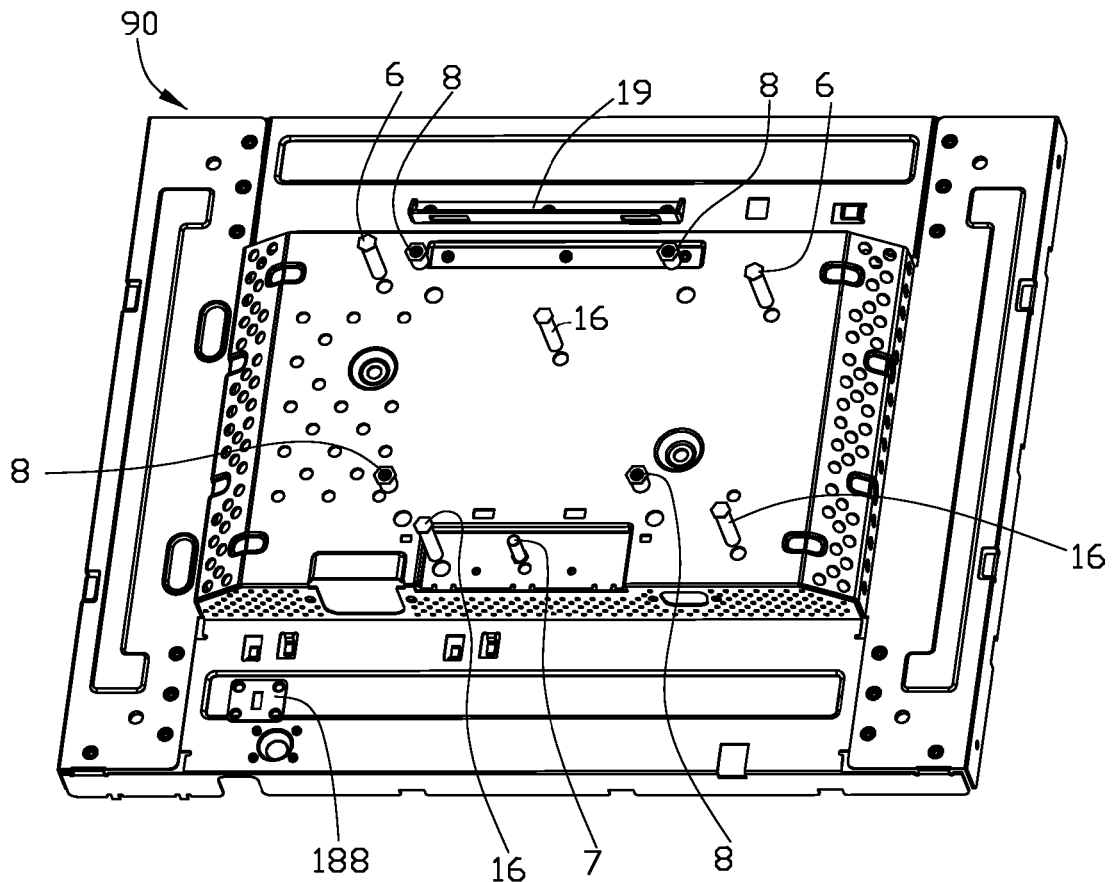
FIG. 1 is an exploded, isometric view of a workpiece, together with electrically conductive fasteners which need to be checked.
Figure 2:
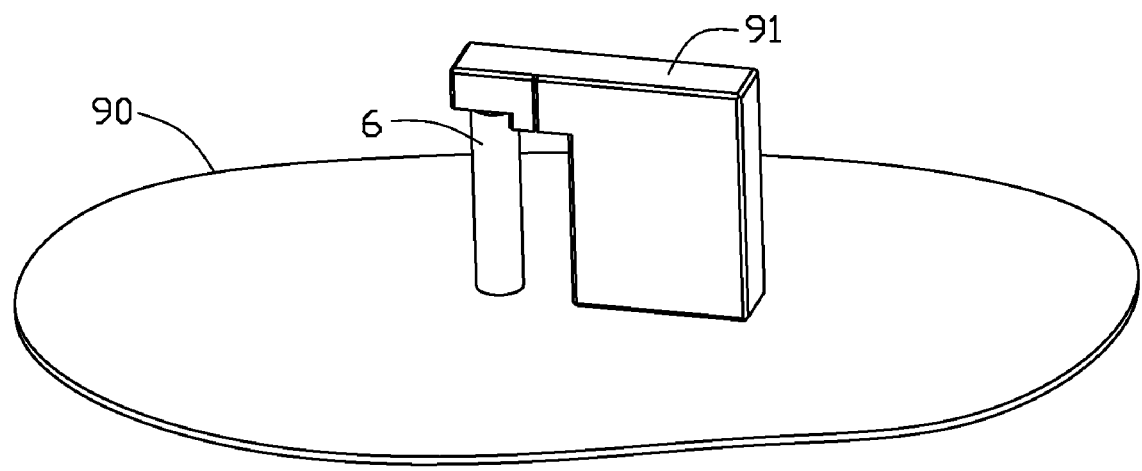
FIG. 2 is an isometric view of a typical height detecting tool checking a height of a fastener of the workpiece.
Figure 3:
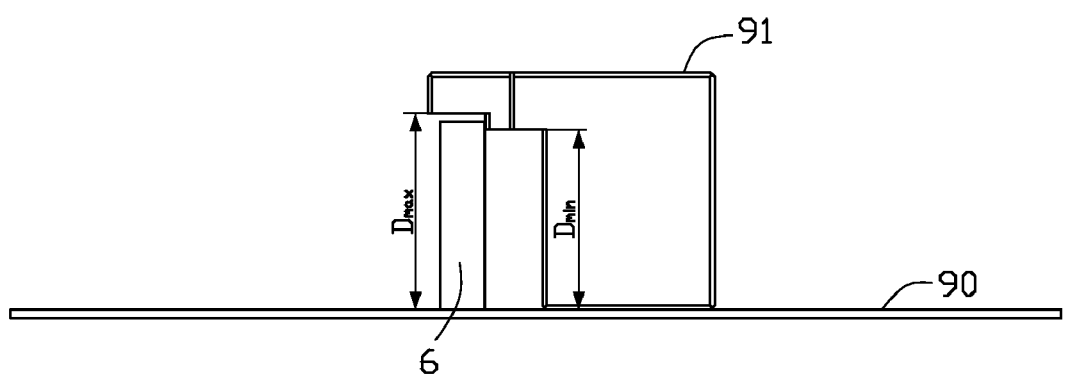
FIG. 3 is a side, elevational view of FIG. 2.
Figure 4:
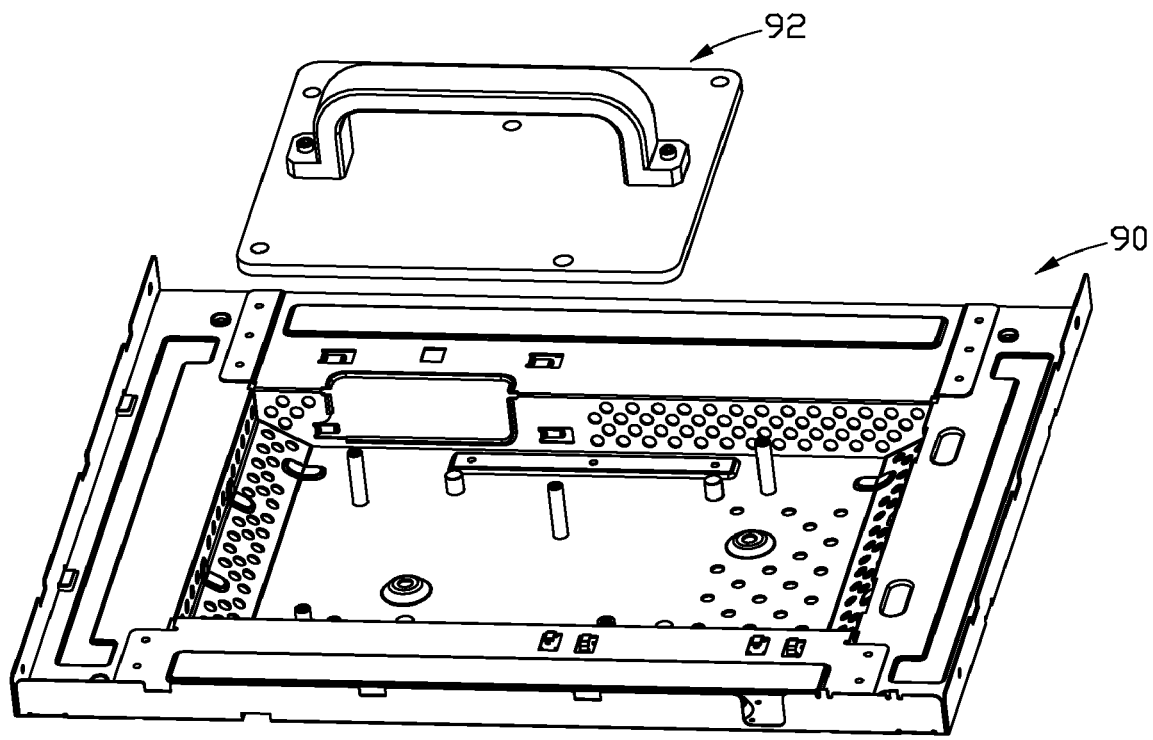
FIG. 4 is an isometric view of a typical detecting tool used for checking accuracy of linearity and/or position and the workpiece.
Figure 5:
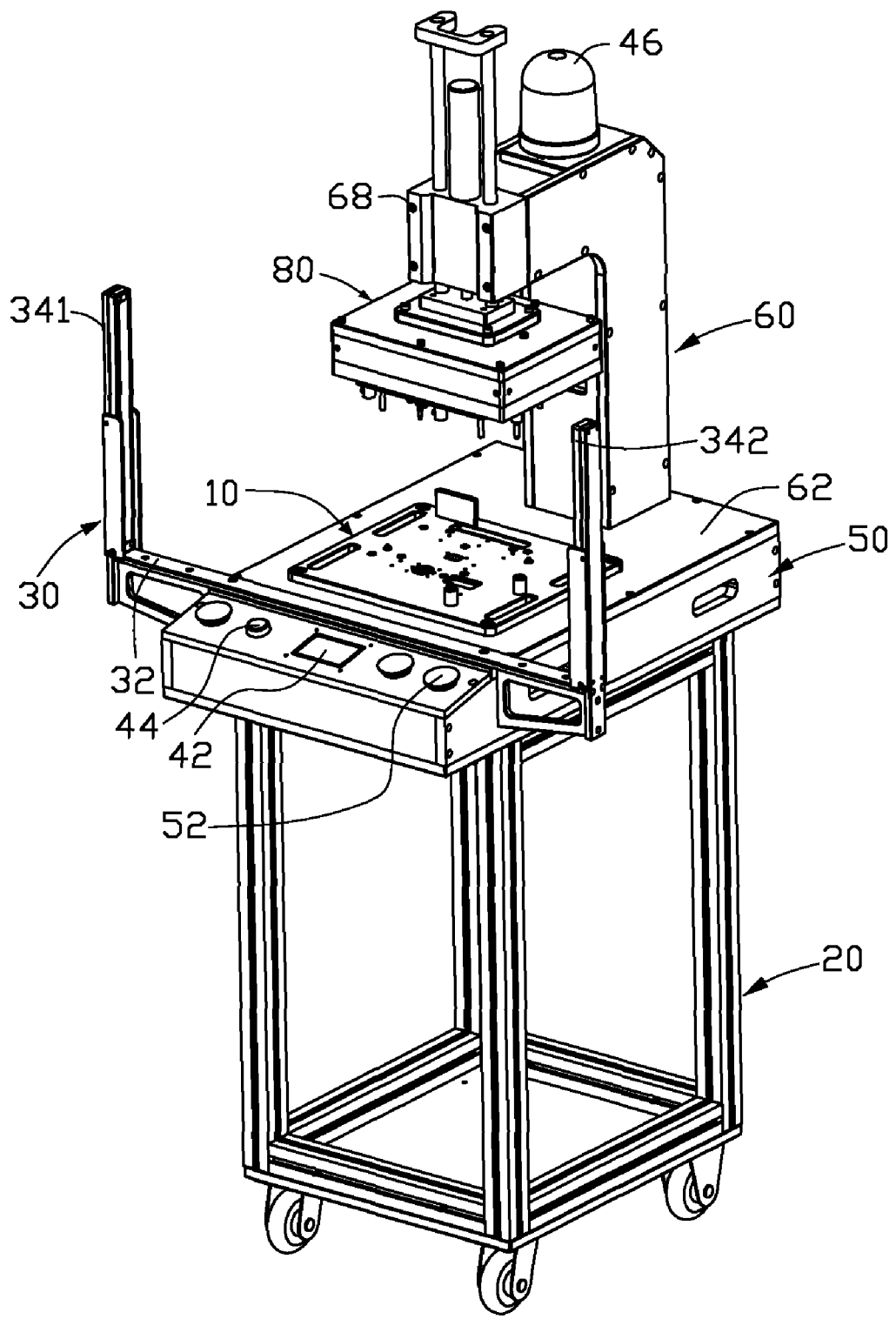
FIG. 5 is an isometric view of a detecting apparatus in accordance with an embodiment of the present invention.
Figure 6:
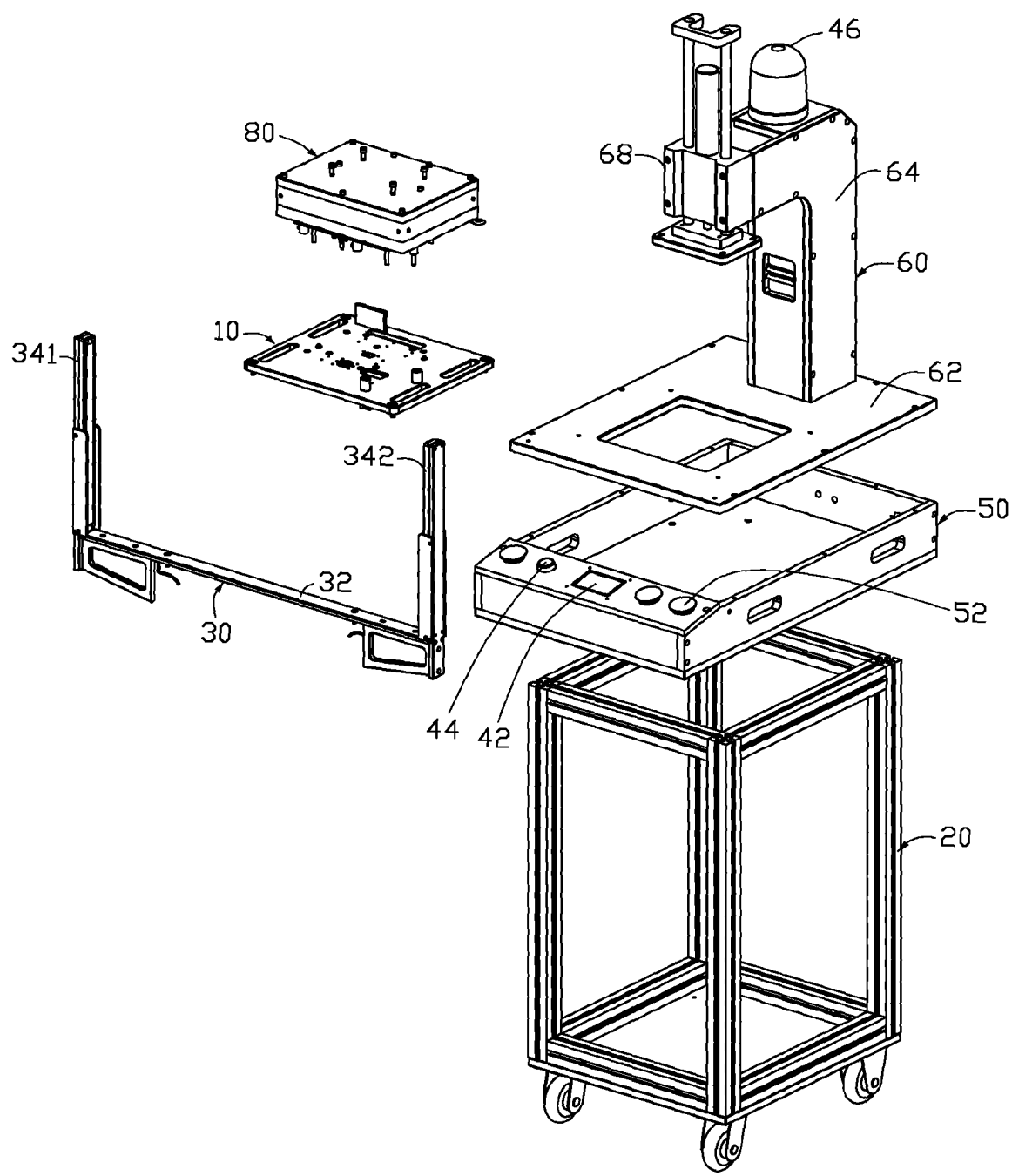
FIG. 6 is an exploded, isometric view of FIG. 5.

Referring to FIGS. 5 and 6, a detecting apparatus in accordance with an embodiment of the present invention includes an electric control box 50, a table 20 for supporting the electric control box 50, a brace 60 mounted on the box 50, a safety light grid device 30 mounted at the front of the box 50, a lower checking member 10 mounted on a bottom plate 62 of the brace 60, a cylinder device 68 fixed to the brace 60, and an upper checking member 80 fixed to the cylinder device 68 and suspended over the lower checking member 10.

A display 42, an indicator light 44, and a plurality of controller buttons 52 are set at the front of the electric control box 50. An electrical source (not shown) and a processor 100 (see FIG. 7) are set in the box 50.

The table 20 includes four wheels attached thereto for facilitating moving the detecting apparatus.

The brace 60 includes an L-shaped supporter 64. The bottom plate 62 is fixed at a bottom of the supporter 64. A visible or audible alarm apparatus, such as an alarm annunciator 46, set on a top of the supporter 64. A hole, over which the lower checking member 10 is set, is defined in the bottom plate 62.

The display 42, the indicator light 44, and the annunciator 46 make up an indicator of the embodiment.

The safety light grid device 30 includes a chassis 32 mounted to the electric control box 50, and a light transmitter 341 and a light receiver 342 respectively mounted at opposite sides of the chassis 32. The light transmitter 341 and the light receiver 342 are connected to an on-off circuit of the detecting apparatus. Light is transmitted from the light transmitter 341 to the light receiver 342 across a space between the two sides of the grid device 30. When some part of an operator's body passes through the space to enter a working area of the detecting apparatus, the part of the body will cut off light between the light transmitter 341 and the light receiver 342, which causes the detecting apparatus to stop thereby protecting the operator.

Figure 8:
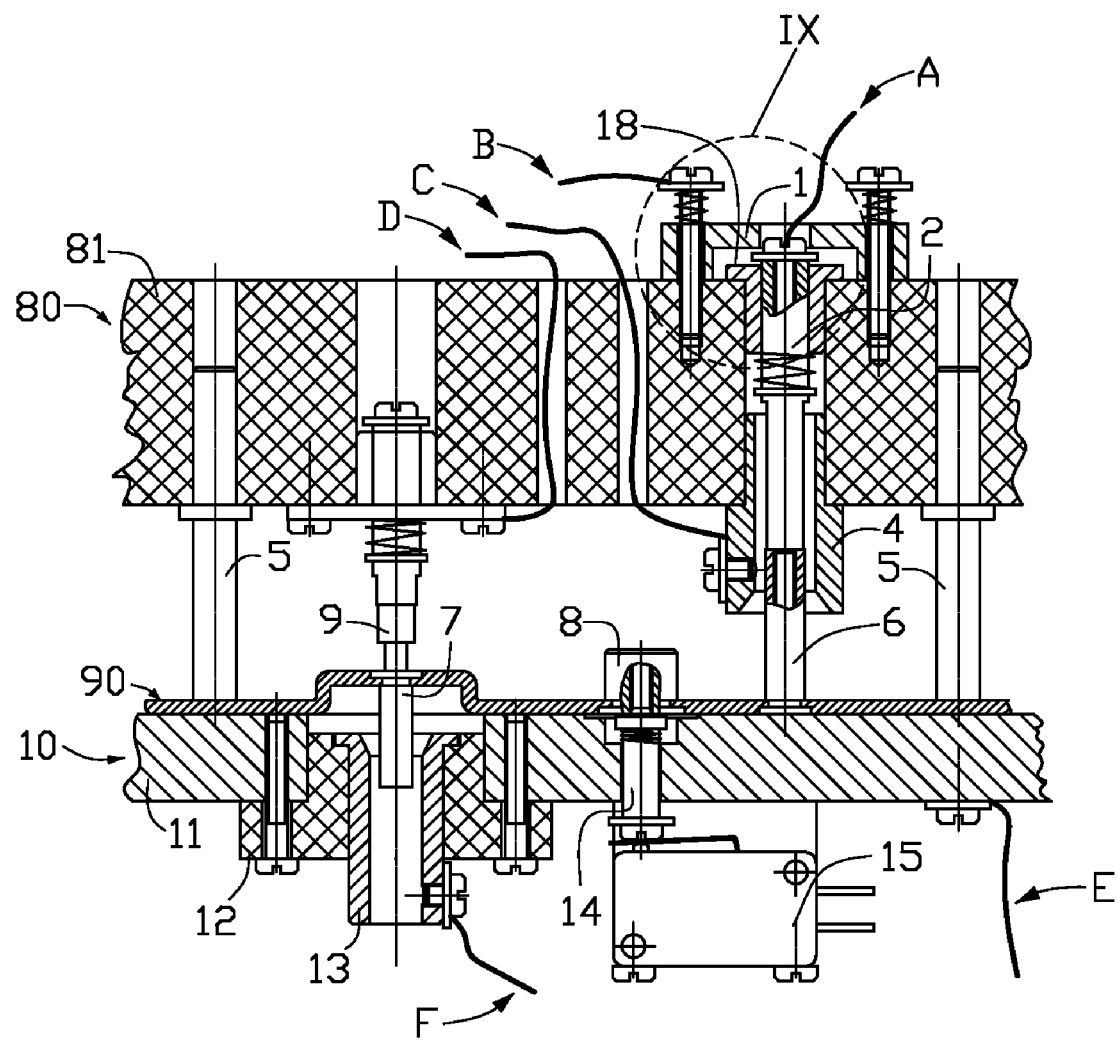
FIG. 8 is a partial cut-away view of the detecting apparatus in operation and the workpiece of FIG. 1, showing the fasteners being eligible.

Referring also to FIG. 8, the lower checking member 10 designed according to a shape of the workpiece 90 includes a board 11 made of electrically conductive material, at least one fixing block 12 made of electrically insulative material and fixed at a bottom of the board 11, at least one steel checking sheath 13 correspondingly set in the fixing block 12, at least one spring-loaded checking pin 14 slidably mounted in the board 11, and at least one travel detector 15 fixed at the bottom of the board 11, and placed under the checking pin 14. A first end of a wire E is connected to the board 11, and a second end of the wire E is connected to the electrical source in the electric control box 50. A first end of a wire F is connected to the checking sheath 13, and a second end of the wire F is connected to the electrical source.

The upper checking member 80, which is box-shaped and driven by the cylinder device 68 to move in an up-and-down direction, includes a base 81 made of electrically insulative material, a plurality of posts 5 mounted at a bottom of the base 81 for pressing against the workpiece which is placed on the lower checking member 10. At least one spring-loaded checking pin 9 is slidably mounted at the bottom of the base 81. At least one steel checking-sheath 4 is mounted in a bottom portion of the base 81, and at least one steel fixing sheath 18 is mounted in a top portion of the base 81 corresponding to the checking sheath 4. At least one spring-loaded checking pin 2 is slidably extended through the base 81 via the fixing sheath 18 and correspondingly through a column-shaped space defined in the checking sheath 4. At least one spring-loaded checking block 1 is slidably mounted on the base 81 above the corresponding at least one checking pin 2. The posts 5, the checking pin 9, the checking sheath 4, the fixing sheath 18, the checking pin 2, and the checking block 1 are all made of electrically conductive material. A first end of a wire A is connected to the checking pin 2, a first end of a wire B is connected to the checking block 1, a first end of a wires C is connected to the checking sheath 4, and a first end of a wire D is connected to the checking pin 9. Second ends of wires A, B, C and D are connected to the electrical source in the electric control box 50.

Figure 7:
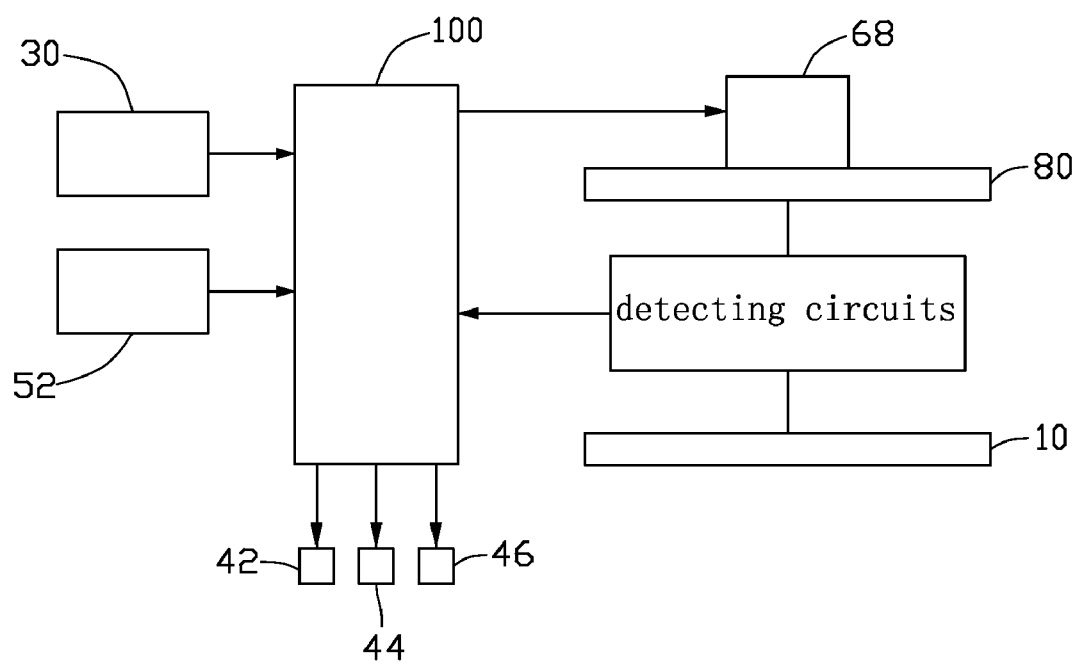
FIG. 7 is an electrical schematic of the present invention.

Referring to FIG. 7, an electrical schematic of the present invention is shown. Signals, which are used to send orders to the processor 100 to start or stop the working of the detecting apparatus, can be transmitted from the safety light grid device 30 and the buttons 52 to the processor 100. A signal, which is used to control the cylinder device 68 to move up and down, is transmitted from the processor 100 and the buttons 52 to the cylinder device 68. The upper checking member 80 is driven by the cylinder device 68 to move towards or away from the lower checking member 10. Detecting circuits (see below) are monitored by the processor 100 when the upper checking member 80 moves towards the lower checking member 10. The processor 100 detects closed or open states of the detecting circuits, and then sends signals to the indicator made up of the display 42, the indicator light 44, and the annunciator 46.

In what follows, one first rivet 6, one third rivet 8, and one fourth rivet 7 are taken as examples for describing the working principle of the detecting apparatus in accordance with the embodiment.

Figure 10:
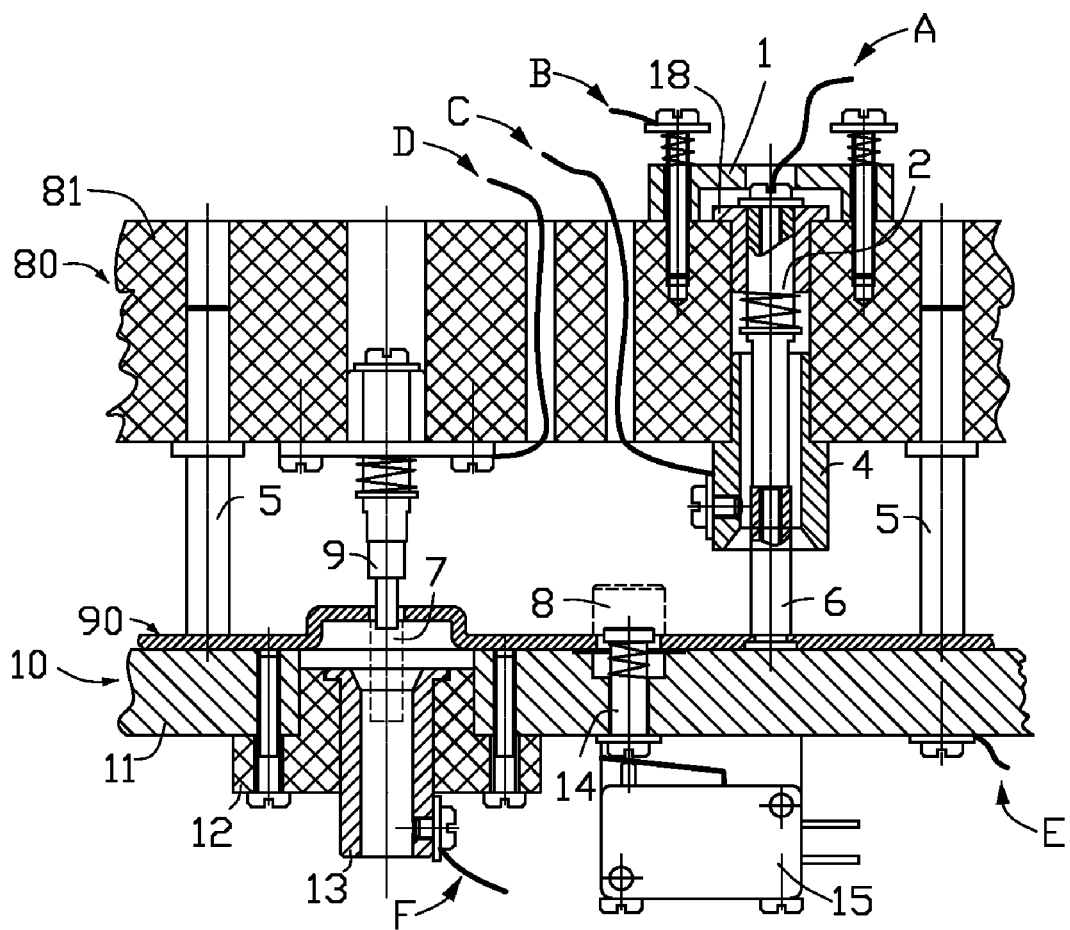
FIG. 10 is similar to FIG. 8, without the fasteners in place.

Referring to FIG. 10, and comparing FIG. 10 with FIG. 8, FIG. 8 shows that the detected items of the first rivet 6, the third rivet 8 and the fourth rivet 7 are eligible with zero-deviation, while FIG. 10 shows a state that the first rivet 6, the third rivet 8 and the fourth rivet 7 are not attached to the workpiece 90. The workpiece 90 is placed on the lower checking member 10. The upper checking member 80 driven by the cylinder device 68 moves down until its posts 5 just press on the workpiece 90.

For the fourth rivet 7, if it is attached to the workpiece 90 as shown in FIG. 8, the checking pin 9 will be stopped by the fourth rivet 7 and pushed to move upward relatively to the upper checking member 80 with a spring around the checking pin 9 compressed, a detecting circuit including the checking pin 9 and the fourth rivet 7 closes, and current flows from the electrical source through the wire D, the checking pin 9, the fourth rivet 7, the workpiece 90, the lower checking member 10, the wire E, and back to the electrical source. The processor 100 receives a circuit closed signal and controls the indicator to indicate that the fourth rivet 7 is attached to the workpiece 90; otherwise, if the fourth rivet 7 is not attached to the workpiece 90, the checking pin 9 moves downward with the upper checking member 80, and enters a mounting hole for the fourth rivet 7 without contacting with the workpiece 90, and the detecting circuit including the checking pin 9 and the fourth rivet 7 remains open and the processor 100 registers that the detecting circuit is open and controls the indicator to indicate that the fourth rivet 7 is not attached to the workpiece 90.

For the fourth rivet 8, if it is attached to the workpiece 90, the checking pin 14 is pressed by the fourth rivet 8 and moves downward with a spring around the checking pin 14 compressing, until it presses and activates a switch of the travel detector 15, a detecting circuit including the checking pin 14, the travel detector 15, and the third rivet 8 closes. The processor 100 registers the closed detecting circuit and controls the indicator to indicate that the fourth rivet 8 is attached to the workpiece 90; otherwise, if the fourth rivet 8 is not attached to the workpiece 90, the checking pin 14 can not be pressed, and the detecting circuit including the checking pin 14, the travel detector 15, and the third rivet 8 remains open. The processor 100 detects the open state and controls the indicator to indicate that the fourth rivet 8 is not attached to the workpiece 90.

Similarly, the ways for checking whether the fourth rivet 7 and the third rivet 8 are attached to the workpiece 90, may be used to check the presence of other electrically conductive fasteners of the workpiece 90.

Figure 11:
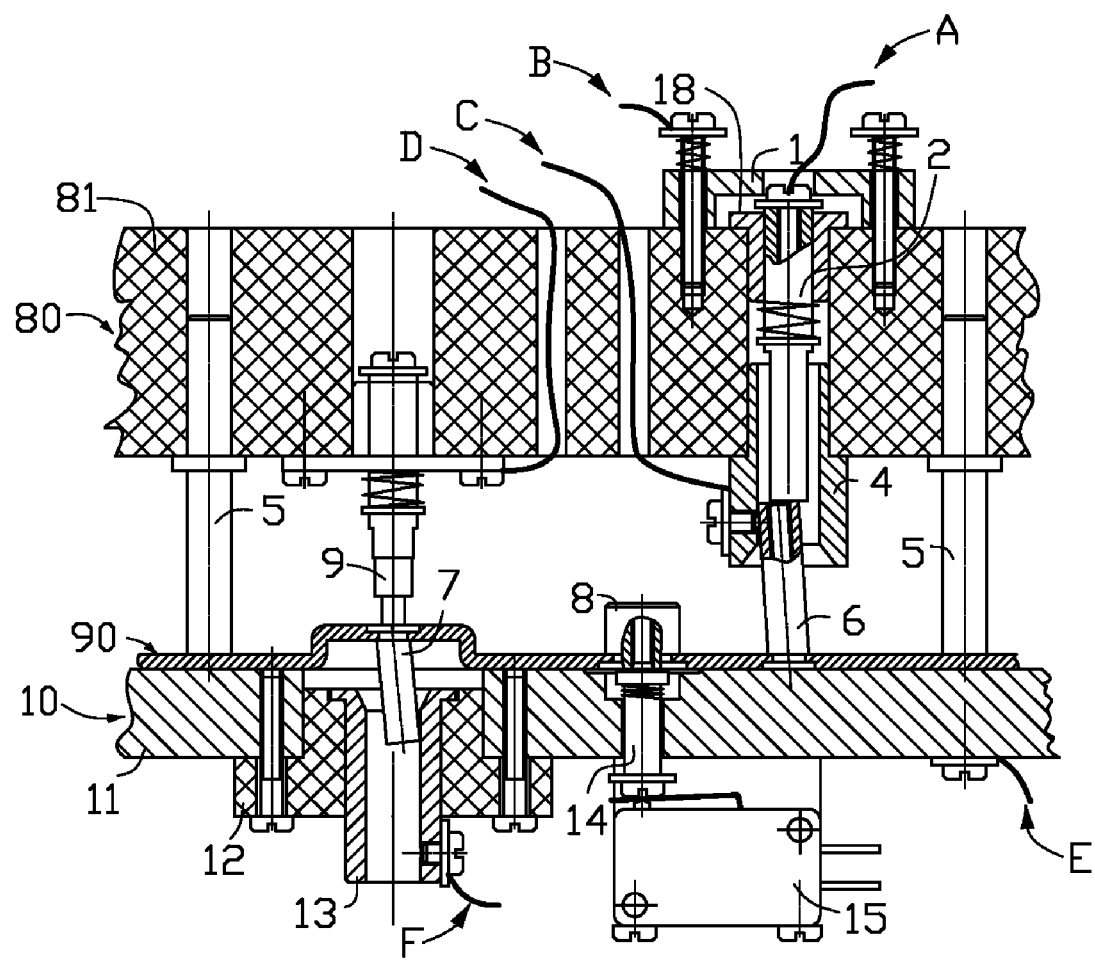
FIG. 11 is similar to FIG. 8, showing accuracies of linearity and/or position of the fasteners being ineligible.

Referring to FIG. 11 in conjunction with FIG. 8, FIG. 11 shows that accuracies of linearity and/or position of the first rivet 6 and the fourth rivet 7 are ineligible. A standard for judging whether the accuracy of linearity and/or position of the rivet 6, 7 is eligible is: if a deflection of linearity and/or position of the rivet 6, 7 is within an allowable tolerance, it is eligible.

For the first rivet 6, suppose when the accuracy of linearity and/or position of the first rivet 6 is eligible with zero-deviation, an axis of the column-shaped space bounded by the checking sheath 4 of the upper checking member 80 is in line with an axis of the rivet 6. Suppose a diameter of a cross-section of the rivet 6 is equal to d6, a value of the allowable tolerance of the accuracy of linearity and/or position of the rivet 6 is equal to $\phi 6$, a diameter of a cross-section of the column-shaped space of the checking sheath 4 is equal to D6, and D6=d6+$\phi$6. When the posts 5 of the upper checking member 80 press the workpiece 90, if the accuracy of linearity and/or position of the rivet 6 is eligible, the rivet 6 enters the checking sheath 4 without touching it, a detecting circuit including the checking sheath 4 and the first rivet 6 remains open, and no current goes through a circuit made up of the wire C, the checking sheath 4, the first rivet 6, the workpiece 90, the lower checking member 10, the wire E, and the electrical source. The processor 100 registers the detecting circuit is open and controls the indicator to indicate that the linearity and/or position of the first rivet 6 is eligible; otherwise, if the rivet 6 is ineligible, the rivet 6 touches the checking sheath 4, the detecting circuit including the checking sheath 4 and the first rivet 6 closes, and the processor 100 registers that the detecting circuit is closed and controls the indicator to indicate that the linearity and/or position of the first rivet 6 is ineligible.

For the fourth rivet 7, suppose when the linearity and/or position of the fourth rivet 7 is eligible with zero-deviation, an axis of the column-shaped space bounded by the checking sheath 13 is in line with an axis of the rivet 7. Suppose a diameter of a cross-section of the rivet 7 is equal to d7, a value of the allowable tolerance of the accuracy of linearity and/or position of the rivet 7 is equal to $\phi$7, a diameter of a cross-section of the column-shaped space of the checking sheath 13 is equal to D7, and D7=d7+$\phi$7. When the posts 5 of the upper checking member 80 press out the workpiece 90, if the linearity and/or position of the rivet 7 is eligible, the rivet 7 enters the checking sheath 13 without touching it, a detection circuit including the checking sheath 13 and the fourth rivet 7 remains open, and no current goes through a circuit made up of the wire D, the checking pin 9, the fourth rivet 7, the checking sheath 13, the wire F, and the electrical source. The processor 100 registers that the detecting circuit is open and controls the indicator to indicate that the linearity and/or position of the first rivet 6 is eligible; otherwise, if the linearity and/or position of the rivet 6 is ineligible, the rivet 6 touches the checking sheath 4, and the detecting circuit including the checking sheath 13 and the fourth rivet 7 closes, and the processor 100 registers that the detecting circuit is closed and controls the indicator to indicate that the linearity and/or position of the first rivet 6 is ineligible.

Figure 9:
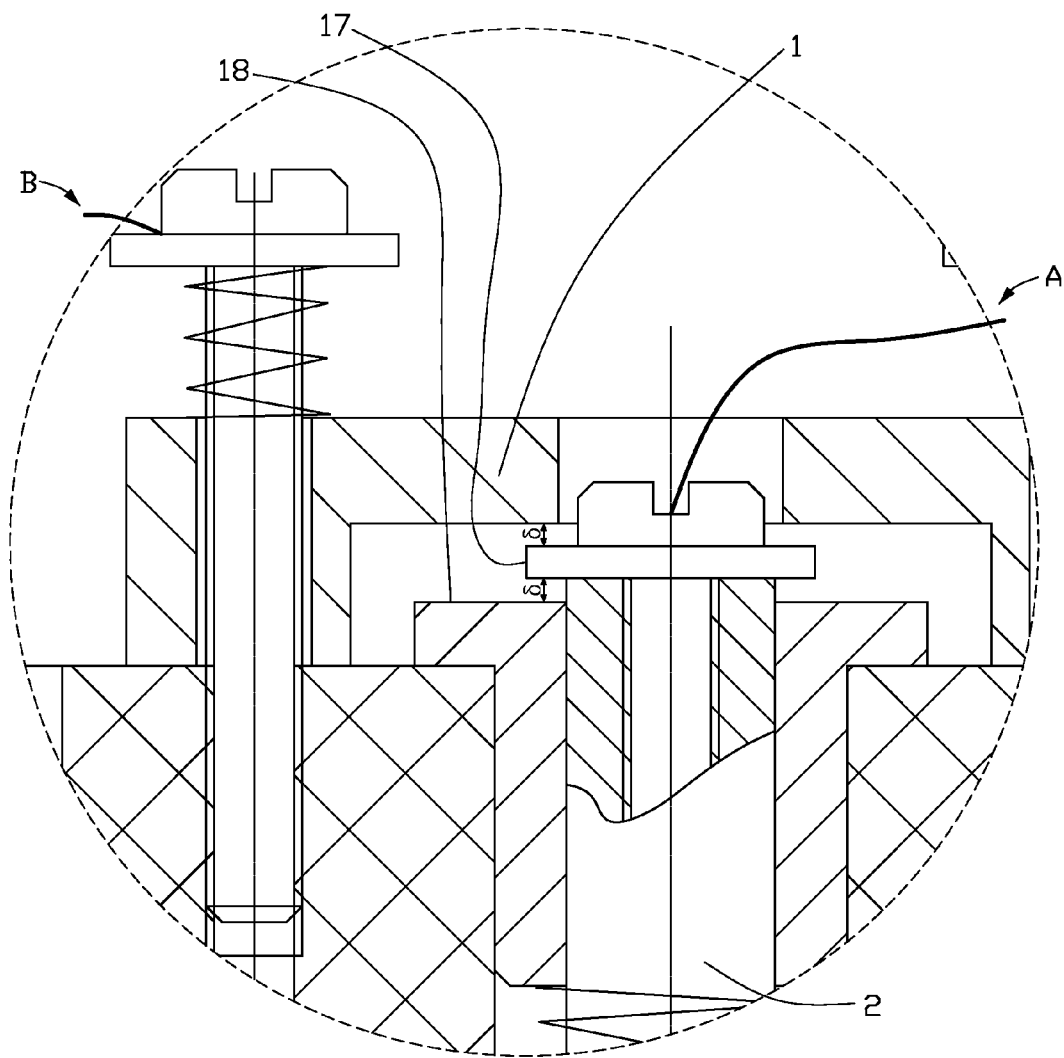
FIG. 9 is an enlarged view of a circled portion IX of FIG. 8.
Figure 12:
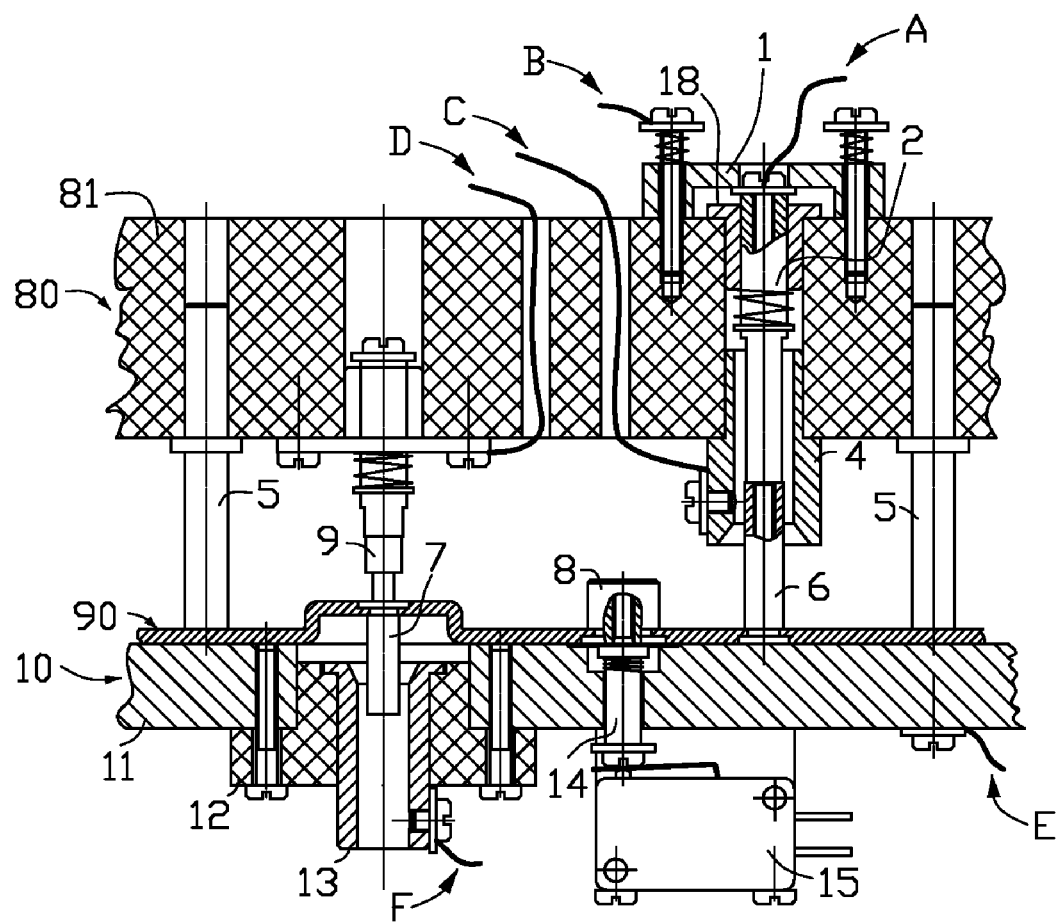
FIG. 12 is similar to FIG. 8, showing heights of the fasteners being too high.

Referring to FIG. 12 in conjunction with FIGS. 8 and 9, FIG. 12 shows that height of the first rivet 6 is too high. A standard for judging whether the height of the rivet 6 is eligible is: if a deflection of height of the rivet 6 is limited in an allowable tolerance, it is eligible; otherwise, it is ineligible, and especially if a value of height of the rivet 6 is not less than an upper limitation of the allowable tolerance, the rivet 6 is too high.

Suppose a value of the allowable tolerance of the height of the rivet 6 is equal to $\delta$. When the posts 5 of the upper checking member 80 press the workpiece 90, if the height of the rivet 6 is eligible, the checking pin 2 of the upper checking member 80 is pushed by the rivet 6 and moves upward, and a moving distance of the checking pin 2 is less than 2$\delta$. Particularly, if there is no deflection of the height of the rivet 6, a distance between a touching piece 17 (shown in FIG. 9) of the checking pin 2 and the checking block 1 is equal to $\delta$, and a distance between the touching piece 17 and the fixing sheath 18 is also equal to $\delta$. At the same time, a first detecting circuit including the checking pin 2 and the first rivet 6 closes, and current of a first circuit flows from the electrical source through the wire A, the checking pin 2, the first rivet 6, the workpiece 90, the lower checking member 10, the wire E, and back to the electrical source. Because the checking pin 2 does not touch the checking block 1, a second detecting circuit including the checking pin 2 and the checking block 1 remains open, and no current goes through a second circuit made up of the wire B, the checking block 1, the checking pin 2, the first rivet 6, the workpiece 90, the lower checking member 10, the wire E, and the electrical source. The processor 100 registers that the first detecting circuit is closed and the second detecting circuit is open, and then controls the indicator to indicate that the height of the rivet 6 is eligible. Otherwise, if the height of the rivet 6 is too high, the checking pin 2 of the upper checking member 80 is pushed by the rivet 6 and moves upward, and a moving distance of the checking pin 2 is not less than 2$\delta$. At the same time, the first detecting circuit including the checking pin 2 and the first rivet 6 closes, and current goes through the first circuit. Because the checking pin 2 moves upward so long a distance that the checking pin 2 touches the checking block 1, the second detecting circuit including the checking pin 2 and the checking block 1 closes, and current goes through the second circuit. The processor 100 registers that the first and second detecting circuits are closed and controls the indicator to indicate that the height of the rivet 6 is ineligible and too high.

Similarly, the way for checking whether the height of the first rivet 6 is too high, may be used for checking whether the longer first rivet 6 is misplaced on a place of the shorter second rivet 16 should be instead.

Figure 13:
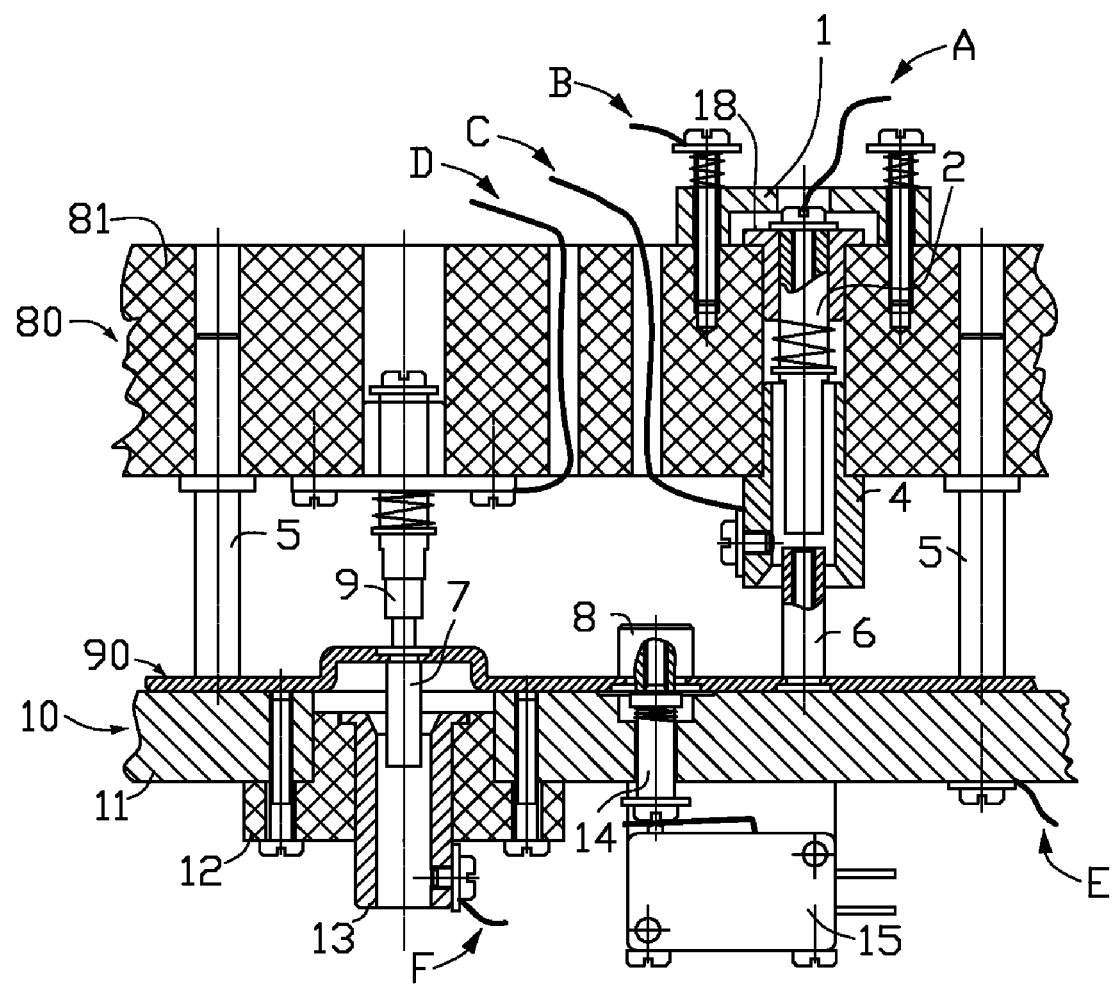
FIG. 13 is similar to FIG. 8, showing heights of the fasteners being too low.

Referring to FIG. 13, in conjunction with FIGS. 8 and 9, FIG. 13 shows that height of the first rivet 6 is too low. A standard for judging whether the height of the rivet 6 is eligible is: if a deflection of height of the rivet 6 is limited in an allowable tolerance, it is eligible; otherwise, it is ineligible, and if a value of a height of the rivet 6 is less than a lower limitation of the allowable tolerance, the rivet 6 is too low.

When the posts 5 of the upper checking member 80 press the workpiece 90, if the height of the rivet 6 is eligible, the checking pin 2 of the upper checking member 80 is propped up by the rivet 6 and moves upward, and a moving distance of the checking pin 2 is less than 2$\delta$. At the same time, a detecting circuit including the checking pin 2 and the first rivet 6 closes, and current flows from the electrical source through the wire A, the checking pin 2, the first rivet 6, the workpiece 90, the lower checking member 10, the wire E, and back to the electrical source. The processor 100 receives a circuit closed signal and controls the indicator to indicate that the height of the rivet 6 is eligible. Otherwise, if the height of the rivet 6 is too low to touch the checking pin 2 of the upper checking member 80, the detecting circuit including the checking pin 2 and the first rivet 6 remains open, and the processor 100 registers that the circuit is open and controls the indicator to indicate that the height of the rivet 6 is ineligible and too low.

Similarly, the way for checking whether the height of the first rivet 6 is too low, may be used for checking whether the shorter second rivet 16 is misplaced on a place of the longer first rivet 6 should be instead.

Information of closing or opening of each circuits above is collected, judged and processed by the processor 100.

According to the above description, a closed or open state of each circuit only relies on the corresponding detecting circuit including the fastener that needs to be checked and checking parts correlative with the fastener. Thus, in fact, what the processor 100 has done is collecting, judging and processing of information of closing or opening of the detecting circuits. The processor 100 sends processing result to the indicator made up of the display 42, the indicator light 44 and the bottom plate 62. If the indicator receives a result that all detected items of all the fasteners are eligible, the indicator light 44 shines and the display 42 indicates the workpiece 90 has passed. If the indicator receives a result that some detected items of the fasteners are ineligible, the bottom plate 62 alarms and the display 42 shows locations of the ineligible fasteners and the corresponding ineligible detected items. In other embodiments, an indicator may be made up of one or two of the display 42, the indicator light 44 and the bottom plate 62.

Moreover, according to different needs of checking precision, the springs in the embodiment may be other elastic elements instead, such as acrylic resin, elasticity rubber, and hydraulic mechanism.

It is believed that the present embodiments and their advantages is understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A detecting apparatus for checking at least one detected item of at least one electrically conductive fastener attached to a workpiece, comprising:
    a lower checking member configured to support the workpiece;
    an upper checking member movably set above the lower checking member;
    an electrical source;
    a processor; and
    an indicator;
    wherein at least one of the lower checking member and the upper checking member comprises at least one checking unit corresponding to the at least one detected item of the fastener, the at least one checking unit cooperates with the corresponding fastener to form a detecting circuit, the detecting circuit is connected to two electric poles of the electrical source, wherein the at least one checking unit is connected to one of the two electric poles and the corresponding fastener is connected to the other one of the two electric poles, a closed or open state of the detecting circuit exists depending on whether the at least one checking unit touches the corresponding fastener when the upper checking member abuts against the workpiece to close the detecting circuit and indicates whether the detected item is eligible or ineligible, the processor controls the indicator to show the checking result according to the closed or open state of the detecting circuit;
    wherein the fastener has a cylindrical shape, the checking unit comprises an electrically conductive checking sheath, the fastener enters a column-shaped space bounded by the checking sheath when the upper checking member abuts against the workpiece, the detected item is an accuracy of linearity and/or position of the fastener, a condition of ineligible of detected item is that a value of a deflection of linearity and/or position of the fastener is not less than an allowable tolerance of the accuracy of linearity and/or position of the fastener, an axis of the column-shaped space of the checking sheath and an axis of the fastener are in line when the accuracy of linearity and/or position of the fastener is eligible, a diameter of a cross-section of the column-shaped space is longer than a diameter of a cross-section of the fastener and a difference between the diameters is equal to the allowable tolerance, if the fastener touches with the checking sheath when the fastener enters the column-shaped space of the checking sheath, the detecting circuit closes and the accuracy of linearity and/or position of the fastener is ineligible, or if the fastener does not touch with the checking sheath when the fastener enters the column-shaped space of the checking sheath, the detecting circuit remains open and accuracy of linearity and/or position of the fastener is eligible.

2. The detecting apparatus as claimed in claim 1, wherein the checking unit comprises an elastic-element-loaded electrically conductive checking pin slidably mounted thereto, the detected item is whether the fastener is attached to the workpiece, the checking pin doesn't touch with the fastener and the detecting circuit remains open if the fastener is not attached to the workpiece, or the checking pin elastically contacts the fastener and the detecting circuit closes if the fastener is attached to the workpiece.

3. The detecting apparatus as claimed in claim 1, wherein the checking unit comprises an electrically conductive checking pin elastically restrained by an elasticity element and slidably mounted, the detected item is whether a height of the fastener is too low, a condition of ineligible of the detected item is that the fastener is too low so that a value of a deflection of height of the fastener is more than an allowable tolerance of the height of the fastener, the checking pin touches with the fastener when the upper checking member abuts against the workpiece and the detecting circuit closes if the height of the fastener is eligible, or the checking pin doesn't touch with the fastener when the upper checking member abuts against the workpiece and the detecting circuit remains open if the height of the fastener is too low.

4. The detecting apparatus as claimed in claim 1, wherein the lower checking member consists of electrically conductive material, the lower checking member, the detecting circuit and electrical source are in the same electrical circuit.

5. The detecting apparatus as claimed in claim 4, wherein a plurality of posts is mounted at a bottom of the upper checking member configured for pressing against the workpiece.

6. The detecting apparatus as claimed in claim 5, wherein a cylinder device is mounted thereto configured to drive the upper checking member to move.

7. The detecting apparatus as claimed in claim 6, wherein the detecting apparatus further comprises a brace mounted thereto configured to hold the cylinder device, the brace comprises a L-shaped supporter and a bottom plate, the bottom plate is fixed at a bottom end of the brace and the cylinder device is mounted to another free end of the brace, the lower checking member is mounted on the bottom plate.

8. The detecting apparatus as claimed in claim 7, wherein an electric control box is set under the bottom plate of the brace, a plurality of controller buttons are set on the electric control box, the processor and the electrical source are received in the electric control box.

9. The detecting apparatus as claimed in claim 8, wherein the indicator comprises at least one of a display, an indicator light and an annunciator.

10. The detecting apparatus as claimed in claim 9, wherein the detecting apparatus further comprises a safety light grid device mounting at the front of the electric control box, the safety light grid device comprising a chassis mounting to the electric control box and a light transmitter and a light receiver respectively mounted at opposite sides of the chassis, light is transmitted from the light transmitter to the light receiver across a space between the two sides of the grid device, when some part of an operator's body passes through the space to enter a working area of the detecting apparatus, the part of the body cutting off light in the space and the detecting apparatus stopping working for protecting the operator.

11. The detecting apparatus as claimed in claim 10, wherein a table is mounted under the electric control box configured for supporting the electric control box.

12. A detecting apparatus for checking whether a height of at least one electrically conductive fastener attached to the workpiece is too high, comprising:
a lower checking member configured to support the workpiece;
an upper checking member movably set above the lower checking member;
an electrical source;
a processor; and
an indicator;
wherein at least one of the lower checking member and the upper checking member comprises at least one elastic-element-loaded checking pin slidably mounted thereto and at least one elastic-element-loaded checking block slidably mounted thereto corresponding to said at least one electrically conductive fastener, one end of the checking pin can touch the fastener and be pushed to slide by the fastener, the other end of the checking pin can touch the checking block, the checking pin and the checking block together with the fastener cooperatively form a detecting circuit, the detecting circuit is connected to two electric poles of the electrical source, when the upper checking member abuts against the workpiece, the checking pin is propped up to slide by the fastener and touch the checking block and the detecting circuit closes if height of the fastener is too high, or the checking pin doesn't touch the checking block and the detecting circuit remains open if height of the fastener is not too high; the processor controls the indicator to show the checking result according to the closed or open state of the detecting circuit.

13. The detecting apparatus as claimed in claim 12, wherein a plurality of posts is mounted at a bottom of the upper checking member configured for pressing out the workpiece.

14. The detecting apparatus as claimed in claim 12, wherein the elastic-element is a spring.

15. A detecting apparatus for checking at least one detected item of at least one electrically conductive fastener attached to a workpiece, comprising:
a lower checking member configured to support the workpiece;
an upper checking member movably set above the lower checking member;
an electrical source;
a processor; and
an indicator;
wherein at least one of the lower checking member and the upper checking member comprises at least one checking unit corresponding to the at least one detected item of the fastener, the at least one checking unit cooperates with the corresponding fastener to form a detecting circuit, the detecting circuit is connected to two electric poles of the electrical source, a closed or open state of the detecting circuit exists depending on whether the at least one checking unit touches the corresponding fastener when the upper checking member abuts against the workpiece to close the detecting circuit and indicates whether the detected item is eligible or ineligible, the processor controls the indicator to show the checking result according to the closed or open state of the detecting circuit;
wherein the fastener has a cylindrical shape, the checking unit comprises an electrically conductive checking sheath, the fastener enters a column-shaped space bounded by the checking sheath when the upper checking member abuts against the workpiece, the detected item is an accuracy of linearity and/or position of the fastener, a condition of ineligible of detected item is that a value of a deflection of linearity and/or position of the fastener is not less than an allowable tolerance of the accuracy of linearity and/or position of the fastener, an axis of the column-shaped space of the checking sheath and an axis of the fastener are in line when the accuracy of linearity and/or position of the fastener is eligible, a diameter of a cross-section of the column-shaped space is longer than a diameter of a cross-section of the fastener and a difference between the diameters is equal to the allowable tolerance, if the fastener touches with the checking sheath when the fastener enters the column-shaped space of the checking sheath, the detecting circuit closes and the accuracy of linearity and/or position of the fastener is ineligible, or if the fastener does not touch with the checking sheath when the fastener enters the column-shaped space of the checking sheath, the detecting circuit remains open and accuracy of linearity and/or position of the fastener is eligible.

16. The detecting apparatus as claimed in claim 15, wherein the detecting apparatus further comprises a brace comprising a reversed-L-shaped supporter and a bottom plate, the bottom plate is horizontally disposed, the supporter extends perpendicularly from the bottom plate and bent to be reversed-L-shaped, the lower checking member is mounted on the bottom plate, a cylinder device is mounted to a free end of the reversed "L" of the brace away from the bottom plate, the upper checking member is mounted to and driven by the cylinder device for moving over the lower checking member.

17. The detecting apparatus as claimed in claim 15, wherein the indicator comprises at least one of a display, an indicator light and an annunciator.

18. The detecting apparatus as claimed in claim 15, wherein the detecting apparatus further comprises a safety light grid device, the safety light grid device comprising a chassis, and a light transmitter and a light receiver respectively mounted at opposite sides of the chassis, light is transmitted from the light transmitter to the light receiver across a space between the two sides of the grid device, when some part of an operator's body passes through the space to enter a working area of the detecting apparatus, the part of the body cutting off light in the space and the detecting apparatus stopping working for protecting the operator.

* * * * *